US012410652B2

(12) United States Patent
Nahrgang et al.

(10) Patent No.: US 12,410,652 B2
(45) Date of Patent: Sep. 9, 2025

(54) ROLLING DOORS WITH TWO-WAY OPERATOR LOGIC

(71) Applicant: CornellCookson, LLC, Mountain Top, PA (US)

(72) Inventors: James Nahrgang, Emmaus, PA (US); Heather Celia Bender, Mountain Top, PA (US)

(73) Assignee: CornellCookson, LLC, Mountain Top, PA (US)

( * ) Notice: Subject to any disclaimer, the term of this patent is extended or adjusted under 35 U.S.C. 154(b) by 281 days.

(21) Appl. No.: 18/155,211

(22) Filed: Jan. 17, 2023

(65) Prior Publication Data

US 2024/0240507 A1 Jul. 18, 2024

(51) Int. Cl.
*E05F 15/72* (2015.01)
*E05F 15/668* (2015.01)
*E05F 15/73* (2015.01)

(52) U.S. Cl.
CPC ............ *E05F 15/72* (2015.01); *E05F 15/668* (2015.01); *E05F 15/73* (2015.01); *E05F 2015/767* (2015.01); *E05Y 2400/40* (2013.01)

(58) Field of Classification Search
CPC ......... E05F 15/72; E05F 15/668; E05F 15/73; E05F 2015/767; E06B 9/68; E06B 2009/6809
See application file for complete search history.

(56) References Cited

U.S. PATENT DOCUMENTS

| | | | |
|---|---|---|---|
| 9,175,513 | B2 | 11/2015 | Dawdy |
| 10,253,546 | B2 | 4/2019 | Goodman et al. |
| 2001/0030606 | A1 | 10/2001 | Jaffe et al. |
| 2003/0103138 | A1 | 6/2003 | Assayag et al. |
| 2018/0266169 | A1 | 9/2018 | Wray et al. |
| 2022/0215708 | A1 | 7/2022 | Reynolds, III et al. |

OTHER PUBLICATIONS

International Search Report and Written Opinion mailed in counterpart PCT Patent Application No. PCT/US2023/060727 on May 1, 2023, 8 pages.

*Primary Examiner* — Beth A Stephan

(57) ABSTRACT

In example implementations, a method executed by a processor of a controller of a rolling door system is provided. The method includes receiving an alarm signal, determining a type of alarm associated with the alarm signal, and transmitting a control signal to operate a motor to open or close a rolling door in response to the type of alarm that is determined.

20 Claims, 8 Drawing Sheets

ROLLING DOORS WITH TWO-WAY OPERATOR LOGIC

BACKGROUND

Rolling doors may be deployed in an opening of a building or warehouse to allow or prevent movement in an area. A rolling door can be rolled up around a barrel to open the door and un-rolled from the barrel to close the door.

In some instances, the operation of the rolling door may be assisted by a torsion spring. The torsion spring can be set with over tensioning or under tensioning to control which direction in which the door may move during an alarm situation. For example, with over tensioning, the rolling door may be set to move to a default open state using mechanical controls during an alarm situation. With under tensioning, the rolling door may be set to move to a default closed stated using mechanical controls during an alarm situation. However, single direction mechanical control for rolling doors during an alarm situation may be insufficient.

DETAILED DESCRIPTION

Examples described herein provide rolling doors with two-way operator logic. As discussed above, during an alarm situation, a rolling door may be mechanically controlled to move in a single direction. For example, stored energy mechanisms may be used to mechanically move the rolling door in a single direction. An example of a stored energy mechanism may be a torsion spring that is over tensioned or under tensioned to cause the rolling door to move to an open state or a closed state, respectively, during an alarm situation.

However, there are some instances where the rolling door should have the capability to move to either a closed state or an open state during different types of alarm situations. For example, during a fire, the rolling door should be moved to an open state to allow people to escape the building. During an active shooter or threat situation, the rolling door should be moved to a closed state to prevent intruders from entering the building. Thus, the stored energy mechanisms that are used to control movement of the rolling door in a single direction during any type of alarm situation may be insufficient.

The present disclosure provides a two-way operator logic that can be used to detect and differentiate between different types of alarms. The two-way operator logic may then be used to electrically control a motor to automatically open or close the rolling door in response to the type of alarm that is detected. Thus, the present disclosure provides automated electrical means to open or close the rolling door during different types of alarm situations, rather than a mechanical solution to respond to all alarms in the same manner by moving the rolling door in a single direction.

In addition, the two-way operator logic may be configured to have a hierarchy of alarm states. That is, some alarm types may override other alarm types if multiple types of alarms are detected simultaneously.

In some embodiments, the present disclosure may also provide visual and audible notifications when an electrical or logic error is detected. For example, the visual notification may be a particular sequence of movements of the rolling door to indicate a sensor failure, loss of electrical signal, loss of power, and the like. Thus, the present disclosure provides an improved method to control rolling doors during different types of alarms using electrical/logic controls, as opposed to mechanical controls that move the rolling door in a single direction.

Figure 1:
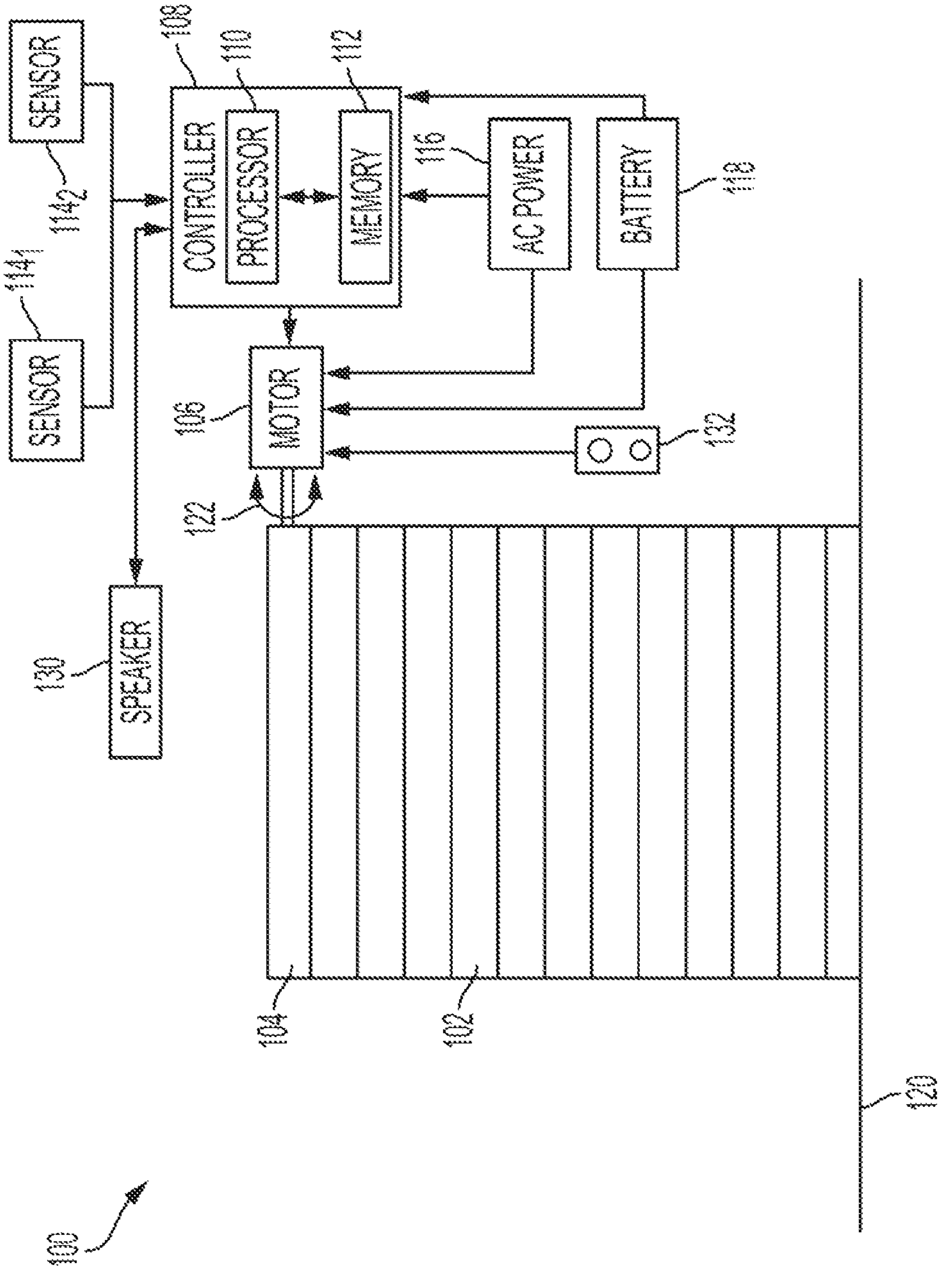
FIG. 1 illustrates a block diagram of an example rolling door with two-way operator logic control of the present disclosure.

FIG. 1 illustrates a block diagram of an example rolling door system 100 of the present disclosure. The rolling door system 100 may be installed at a location 120 (e.g., an opening to a building, warehouse, or storefront, between rooms within a building, and the like). In one embodiment, the rolling door system 100 may include a rolling door 102 coupled to a barrel 104. The rolling door 102 may be a rolling steel grille door or may comprise slats.

The rolling door 102 may be opened by rotating the barrel 104 to have the rolling door 102 wrap around the barrel 104. The rolling door 102 may be closed by rotating the barrel 104 to have the rolling door 102 unwrap from the barrel 104.

In one embodiment, the rolling door system 100 may also include a motor 106, a controller 108, one or more sensors $\mathbf{114}_1$ and $\mathbf{114}_2$, an alternating current (AC) power supply 116, and a battery back-up 118. The motor 106 may be mechanically coupled to the barrel 104. The motor 106 may drive the barrel 104 to rotate the barrel 104 in a clockwise or counter-clockwise direction (as shown by an arrow 122) to open and close the rolling door 102.

The controller 108 may be communicatively coupled to the motor 106. The controller 108 may include a processor 110 and a memory 112 that contains logic to control operation of the motor 106. The processor 110 may be a controller, central processing unit (CPU), an application specific integrated circuit (ASIC) chip, and the like, to execute instructions stored in the memory 112.

The memory 112 may be any type of non-transitory computer readable medium. For example, the memory 112 may be a hard disk drive, a solid state drive, a random access memory (RAM), a read-only memory (ROM), a non-volatile memory express (NVME) memory, or any combination thereof. The memory 112 may store instructions that are executed by the processor 110 to perform the functions described herein.

In one embodiment, as discussed in further details below, the memory 112 may store instructions that allow the controller 108 to determine a type of alarm signal that is received from one of the sensors $\mathbf{114}_1$ and $\mathbf{114}_2$ and to transmit a control signal to the motor 106 based on the type of alarm signal that is determined. For example, one type of alarm signal may cause the controller 108 to control the motor 106 to open the rolling door 104 and another type of alarm signal may cause the controller 108 to control the motor 106 to close the rolling door 104.

In another embodiment, the controller 108 may also control the motor 106 to move the rolling door 106 in a predefined sequence of movements to provide a visual indication. The visual indication may be presented to indicate an error associated with the rolling door 106 (e.g., loss of communication to the network or loss of alternating current (AC) power) or a sensor error detected in one of the sensors $\mathbf{114}_1$ and $\mathbf{114}_2$, and the like.

Figure 4:
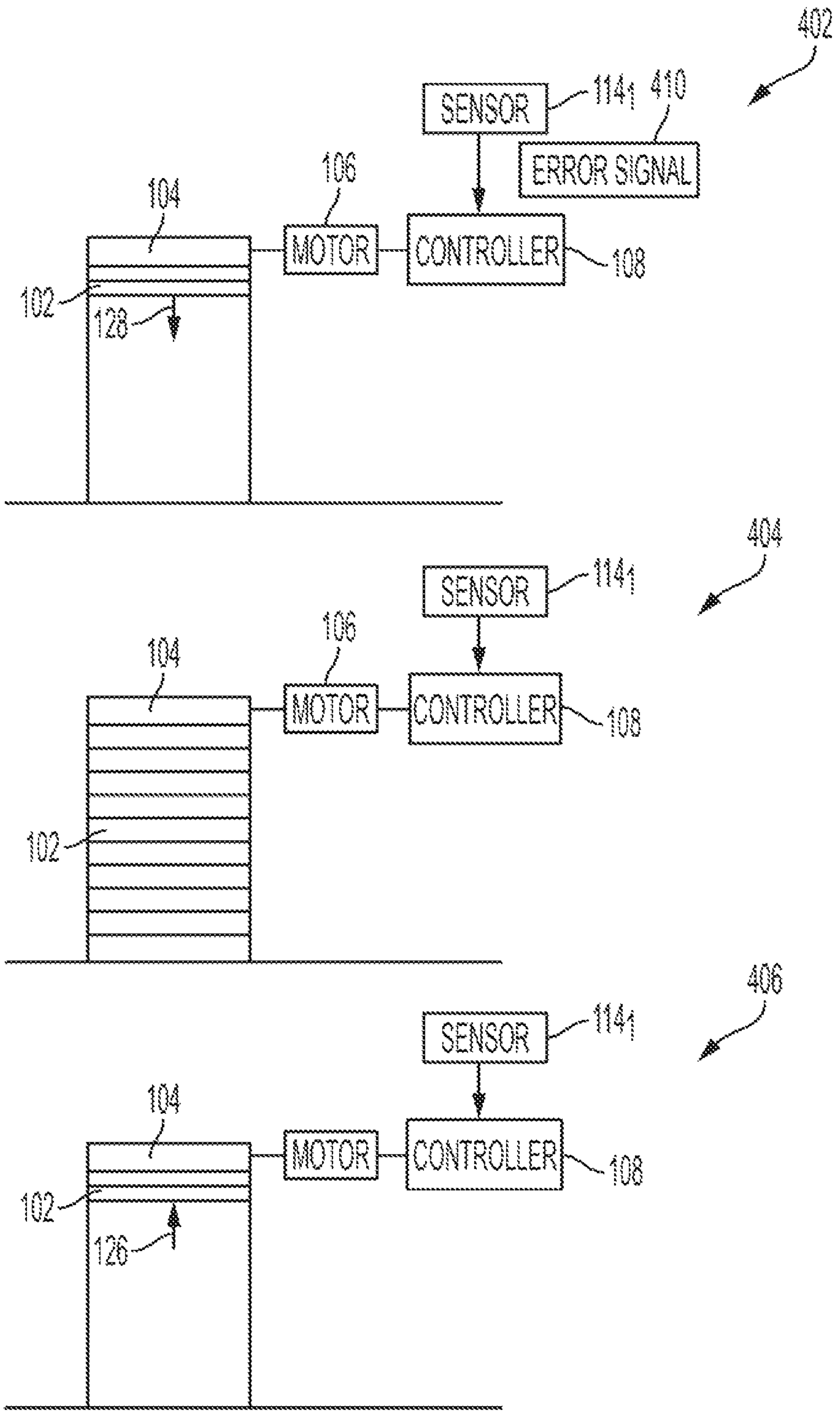
FIG. 4 illustrates a sequence of movements of the example rolling door to indicate a sensor failure of the present disclosure.

In one embodiment, the predefined sequence of movements may include closing the rolling door 106 for a predefined amount of time (e.g., 3 seconds) and then opening the rolling door 106. FIG. 4 illustrates an example of a predefined sequence of movements. At block 402, the controller 108 may receive an error signal 410 from the sensor 114. For example, the error signal 410 may indicate the sensor 114 is powered down, has lost communication with the controller 108, is malfunctioning, and the like. The controller 108 may receive the alarm signal and determine that the alarm signal is a sensor error type of alarm.

In response to the error signal 410, the controller 108 may initiate the predefined sequence of movements. For example, the controller 108 may transmit a control signal to the motor 106 to close the rolling door 102, as shown by a downward arrow 128.

At block 404, the rolling door 102 may stay closed for a predefined amount of time. For example, the predefined amount of time may be a few seconds (e.g., 3 seconds, 5 seconds, 10 seconds, or any other amount of time). In one embodiment, the predefined amount of time may be non-adjustable. At block 406, the controller 108 may transmit a control signal to the motor 106 to open the rolling door 102, as shown by an upward arrow 126.

In another example, the predefined sequence of movements may include moving the rolling door 106 to a particular position (e.g., moving the rolling door 106 to a half closed/half open position). The above described movements are provided as a few examples, but it should be noted that any predefined sequence of movements may be provided as a visual indication.

Referring back to FIG. 1, the door system 100 may also include a speaker 130. The speaker 130 may provide an audible notification for detected errors. Thus, the controller 108 may provide a visual notification and an audible notification when an error is detected.

In one embodiment, the sensors $\mathbf{114}_1$ and $\mathbf{114}_2$ may be different types of sensors. For example, the sensor $\mathbf{114}_1$ may be a fire alarm or smoke detector and the sensor $\mathbf{114}_2$ may be a video camera with facial recognition technology. The sensors $\mathbf{114}_1$ and $\mathbf{114}_2$ may be distributed to different areas or rooms within the location 120. Although two sensors $\mathbf{114}_1$ and $\mathbf{114}_2$ are illustrated in FIG. 1, it should be noted that any number of sensors 114 may be deployed (e.g., one or more than two).

In one embodiment, the sensors $\mathbf{114}_1$ and $\mathbf{114}_2$ may be communicatively coupled to the controller 108. The sensors $\mathbf{114}_1$ and $\mathbf{114}_2$ may transmit alarm signals to the controller 108 via a wired or wireless connection. In one embodiment, the signals may be transmitted via normally closed dry contact that is hard wired. Each alarm signal may be categorized as a particular type of alarm signal that can be associated with a particular state of the rolling door 102.

For example, the types of alarm signals may include evacuation alarms and restricted access alarms. Evacuation alarms may include alarm signals that indicate that people should leave the location 120. Evacuation alarms may include fire alarm signals, smoke alarm signals, carbon monoxide alarm signals, siren or horn signals associated with chemical tanks or heating furnaces, and so forth. The evacuation alarms may be associated with an open state of the rolling door 102. In other words, when the controller 108 determines that the alarm signal is an evacuation type of alarm, the controller 108 may transmit a control signal to the motor 106 to cause the rolling door 102 to move to an open state or open position.

Figure 2:
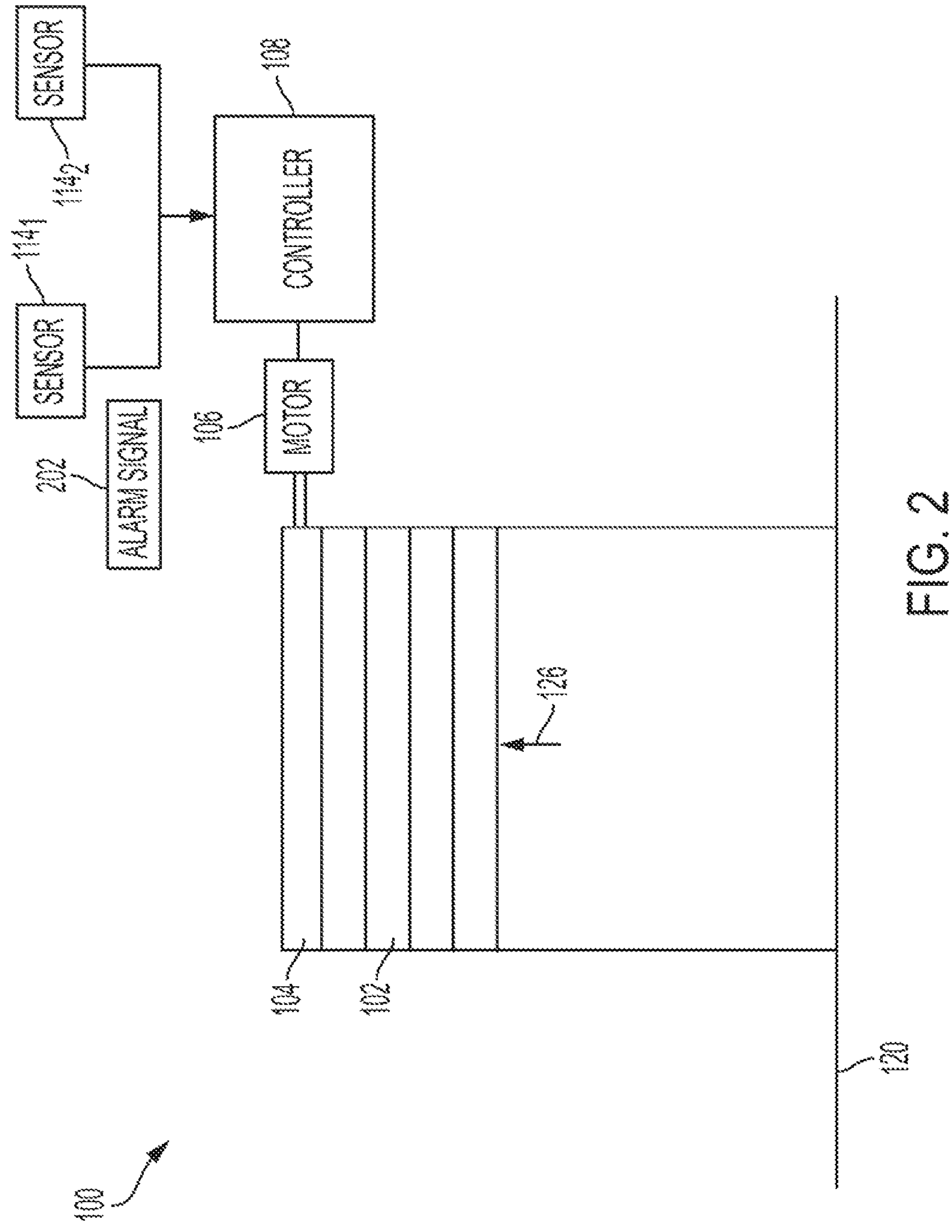
FIG. 2 illustrates a block diagram of the example rolling door moving to an open state in response to an evacuation alarm of the present disclosure.

FIG. 2 illustrates a block diagram of an example of the rolling door 102 moving to an open state in response to an evacuation alarm. As shown in FIG. 2, when the evacuation type of alarm is detected, the controller 108 may transmit a control signal to the motor 106 to open the rolling door 102. The motor 106 may rotate the barrel 104 to open the rolling door 102 in a direction shown by the upward arrow 126.

Restricted access alarms may include alarm signals that indicate an alarm signal to prevent individuals from entering the location 120. For example, the sensor $\mathbf{114}_2$ may be a video camera with facial recognition. The sensor $\mathbf{114}_2$ may detect an individual who is not authorized to enter the location 120 and may send an alarm signal. In another embodiment, the video camera may automatically detect certain objects (e.g., a firearm or weapon) and send an alarm signal. In another embodiment, the sensor $\mathbf{114}_2$ may be a broken glass sensor or other type of forced entry/burglar alarm.

The restricted access alarms may be associated with a closed state of the rolling door 102. In other words, when the controller 108 determines that the alarm signal is a restricted access type of alarm, the controller 108 may transmit a control signal to the motor 106 to cause the rolling door 102 to move to a closed state or closed position.

Figure 3:
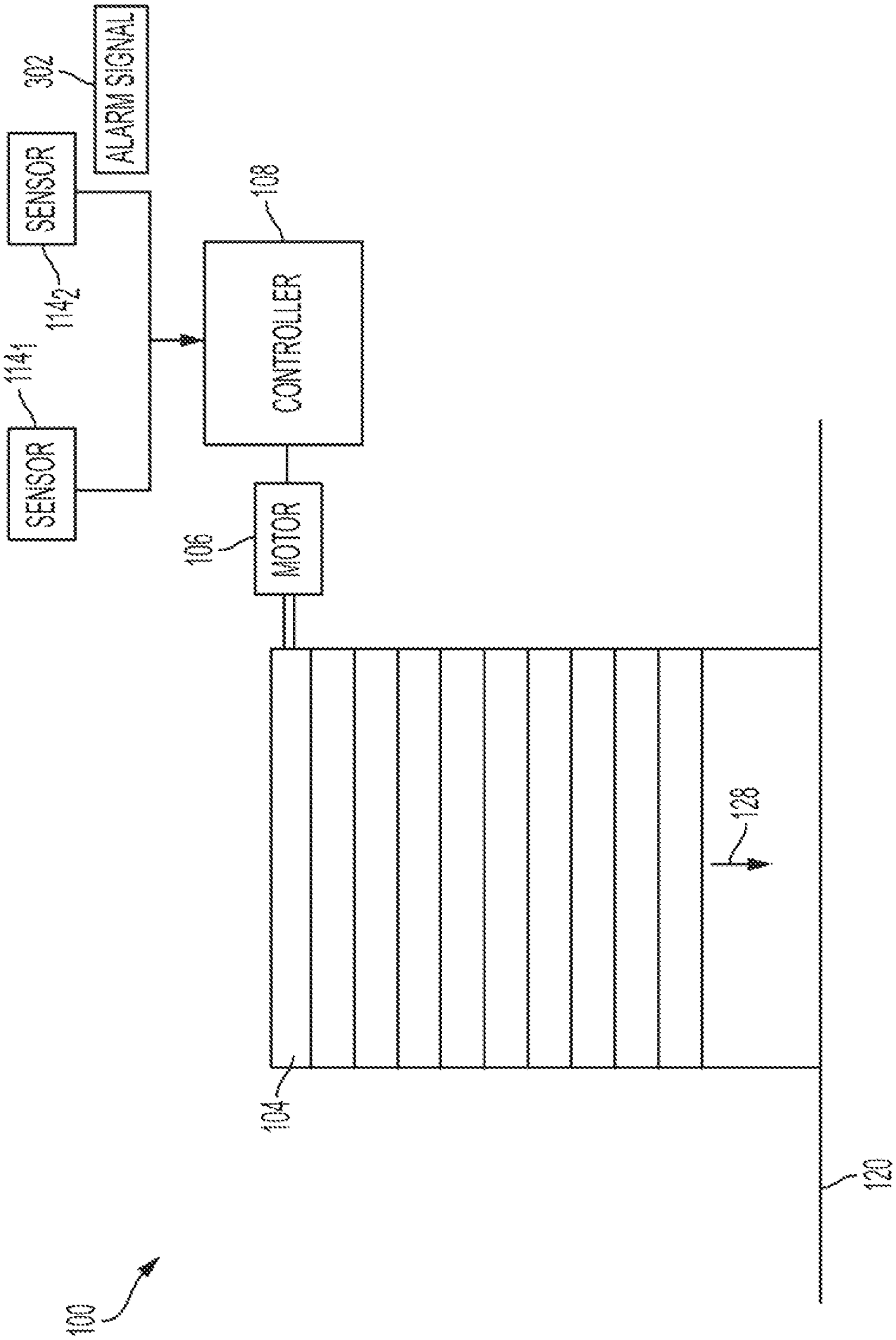
FIG. 3 illustrates a block diagram of the example rolling door moving to a closed state in response to a restricted access alarm of the present disclosure.

FIG. 3 illustrates a block diagram of an example of the rolling door 102 moving to a closed state in response to a restricted access alarm. As shown in FIG. 3, when the restricted access type of alarm is detected, the controller 108 may transmit a control signal to the motor 106 to close the rolling door 102. The motor 106 may rotate the barrel 104 (in an opposite direction from opening the rolling door 102) to close the rolling door 102 in a direction shown by the downward arrow 128.

In one embodiment, the types of alarms may be organized in a prioritized list or hierarchy and stored in the memory 112. For example, the prioritized list may determine how to control the rolling door 102 when multiple different types of alarms are received simultaneously. For example, the controller 108 may receive an evacuation type of alarm and a restricted access type of alarm at the same time. For example, a burglar may be trying to access the location 120 and to start a fire. Thus, both sensors $\mathbf{114}_1$ and $\mathbf{114}_2$ may transmit alarm signals to the controller 108 at the same time.

Based on the prioritized list, the controller 108 may send a control signal based on the type of alarm that has a higher priority. For example, the evacuation type of alarm may have a higher priority than the restricted access type of alarm. Given the above example, the controller 108 may transmit a control signal to the motor 106 to open the rolling door 102 based on the evacuation type of alarm that has a higher priority than the restricted access type of alarm.

In one embodiment, the rolling door system 100 may also include a local control interface 132. During normal operating conditions (e.g., when no alarm signal is present), the operation of the motor 106 to open and close the rolling door 102 may be controlled via the local control interface 132. However, when an alarm signal is present, the local control interface 132 may be disabled until the alarm signal is cleared. Thus, a "normal" operative state or condition may be defined as a state in which all error signals are cleared or removed, and control of the rolling door 102 is restored to the local control interface 132.

In one embodiment, the AC power 116 may provide power to controller the motor 106, the controller 108, and the sensors $114_1$ and $114_2$. Although a single AC power source 116 is illustrated in FIG. 1, it should be noted that different AC power sources 116 may be provided in the location 120. For example, different AC power sources 116 may be deployed to power the motor 106, the controller 108, and the sensors $114_1$ and $114_2$ separately.

The battery 118 may provide back-up power to the motor 106 and to the controller 108 in case of power loss from the AC power 116. In one embodiment, when AC power 116 is lost, an alarm condition internal to the controller 108 may be triggered. Under just AC power loss, the controller 108 may be set to function without deviation. While under the loss of AC power and insufficient battery back-up power to fully operate the door, an alarm condition internal to the controller 108 may be triggered. The controller 108 may determine by a sequencing that the alarm signal is a power loss alarm signal and may transmit a control signal to the motor 106 to move the rolling door 102 in a predefined sequence of movements. The predefined sequence of movements may provide a visual indication that AC power 116 is lost and that there is insufficient battery back-up power, or may provide a visual indication of another failure, and may indicate that the motor 106 and the controller 108 are currently running via the battery 118 to a suitable position.

Thus, the controller 108 is configured with instructions to provide two-way automated control of the rolling door 102 via the motor 106. In other words, the two-way operator logic is not simply unlocking or locking mechanical locks, but rather automatically opening and closing the rolling doors 102 based on a type of alarm signal that is identified. Moreover, the logic implemented in the controller 108 may determine a type of alarm signal that is received. Based on the type of alarm signal that is received, the controller 108 may control the motor 106 to open or close the rolling door 102 in accordance with the type of alarm signal that is determined.

Figure 5:
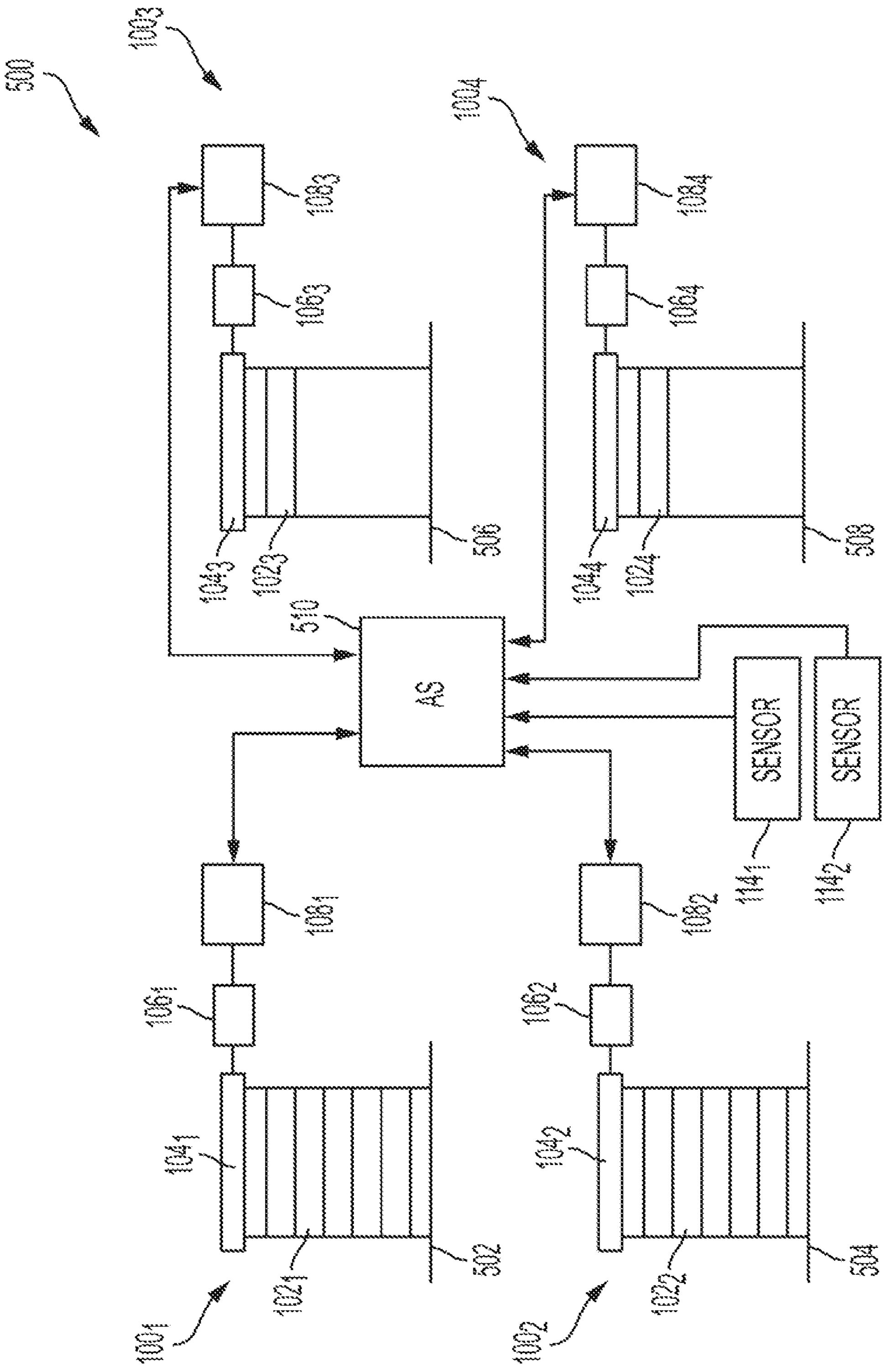
FIG. 5 illustrates an example network of rolling doors with two-way operator logic control of the present disclosure.

FIG. 5 illustrates an example network of rolling doors 102 with two-way operator logic control of the present disclosure. In one embodiment, several rolling door systems may be tied together as part of a network 500. In one embodiment, a plurality of rolling door systems $100_1$-$100_4$ (hereinafter individually referred to as a "rolling door system 100" or collectively referred to as "rolling door systems 100") positioned at different locations 502, 504, 506, and 508, respectively, may be communicatively coupled to an application server (AS) 510. The locations 502, 504, 506, and 508 may be different rooms or areas within a building.

A plurality of different sensors $114_1$ and $114_2$ may be deployed around the building and also communicatively coupled to the AS 510. In one embodiment, alarms generated by the sensors $114_1$ and $114_2$ may be transmitted to the AS 510. The AS 510 may then send coordinated control signals to the different controllers $108_1$-$108_4$ to respond to the different types of alarms in different ways or to forward the alarm signal only to the controller $108_1$, $108_2$, $108_3$, or $108_4$ that is local to, or within the vicinity of (e.g., a predefined distance from), the sensor $114_1$ or $114_2$ that transmitted the alarm signal.

For example, the sensor $114_2$ may send an alarm signal that is determined to be a restricted access type of alarm. The AS 510 may send the alarm signal to the controller $108_1$ and the controller $108_2$ where the sensor $114_2$ is located. As a result, the controllers $108_1$ and $108_2$ may send control signals to respective motors $106_1$ and $106_2$ to close respective rolling doors $102_1$ and $102_2$. The AS 510 may also coordinate to leave the rolling doors $102_3$ and $102_4$ open to allow individuals to escape through the respective locations 506 and 508 (e.g., through a back door or fire escape).

In another example, the sensor $114_1$ may send an alarm signal that is determined to be an evacuation type of alarm. The AS 510 may send the alarm signal to the controller $108_3$ and the controller $108_4$ where sensor $114_1$ is located. As a result, the controllers $108_3$ and $108_4$ may send control signals to respective motors $106_1$ and $106_2$ to open respective rolling doors $102_3$ and $102_4$. The AS 510 may also coordinate to close the rolling doors $102_1$ and $102_2$. For example, a fire may be ongoing between an area in the locations 502 and 504 and an area with the locations 506 and 508. The doors $102_1$ and $102_2$ may be closed to prevent individuals from walking towards the fire (e.g., towards the locations 502 and 504) or to isolate the fire within a particular area of the building.

Although four rolling door systems 100 are illustrated in FIG. 5, it should be noted that any number of rolling door systems 100 may be deployed in the network 500. Although two sensors $114_1$ and $114_2$ are illustrated in FIG. 5, it should be noted that any number of sensors 114 may be deployed in the network 500.

Figure 6:
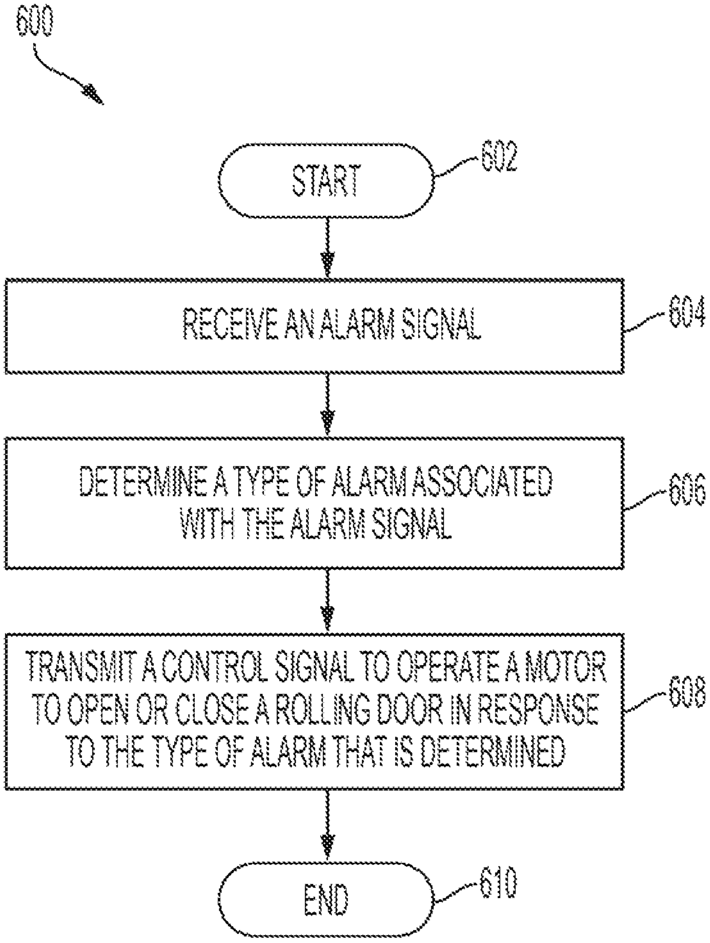
FIG. 6 illustrates an example flow chart of a method of controlling a rolling door of the present disclosure.

FIG. 6 illustrates a flowchart of an example method 600. The method 600 may be performed by the controller 108 illustrated in FIG. 1 or by the apparatus 800 illustrated in FIG. 8, and discussed below.

The method 600 begins at block 602. At block 604, the method 600 receives and alarm signal. For example, the alarm signal may be transmitted from a sensor to a controller.

At block 606, the method 600 determines a type of alarm associated with the alarm signal. For example, different alarm signals may be categorized into different types of alarm signals. In one embodiment, the alarm signals may be categorized as part of an evacuation alarm or a restricted access alarm. However, it should be noted that any type of labels may be used for alarms that should cause a rolling door to be closed or alarms that should cause a rolling door to be opened.

At block 608, the method 600 transmits a control signal to operate a motor to open or close a rolling door in response to the type of alarm that is determined. For example, evacuation alarms may be associated with an open state for the rolling door, while restricted access alarms may be associated with a closed state for the rolling door. Thus, if the alarm signal was determined to be an evacuation type of alarm, the control signal may operate the motor to open the rolling door. If the alarm signal was determined to be a restricted access alarm, the control signal may operate the motor to close the rolling door. At block 610, the method 600 ends.

Figure 7:
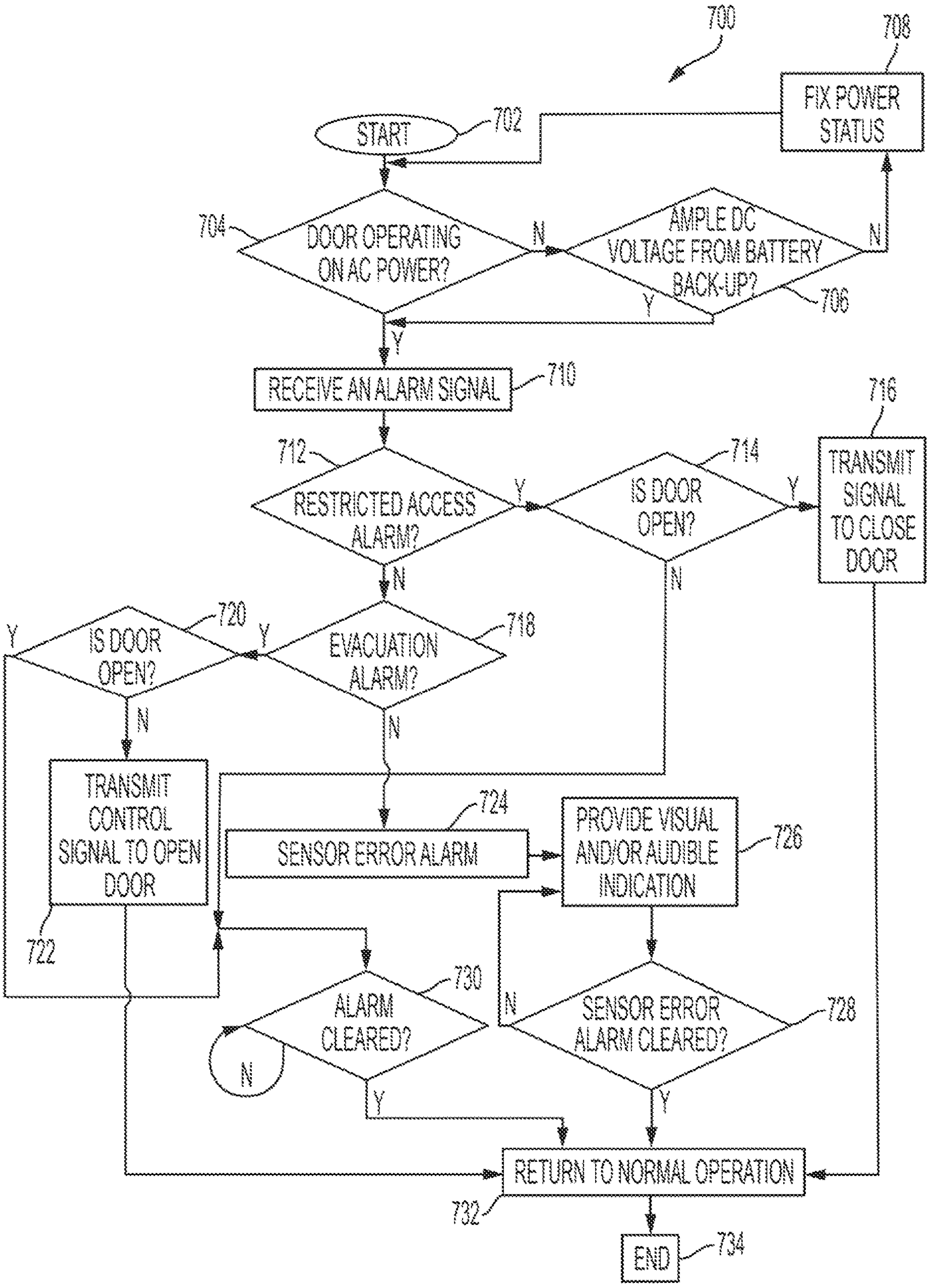
FIG. 7 illustrates an example of a more detailed flow chart of a method of controlling a rolling door of the present disclosure.

FIG. 7 illustrates a more detailed flowchart of an example method 700. The method 700 may be performed by the controller 108 illustrated in FIG. 1 or by the apparatus 800 illustrated in FIG. 8, and discussed below. The method 600, described above, illustrates a simplified flowchart of how the rolling door may be controlled by the two-way operator logic.

However, additional parameters may be analyzed before the rolling door is controlled by the two-way operator logic. For example, method 700 details how a power status of the rolling door may be analyzed and a current state of the rolling door (e.g., is the door already open or closed) may be analyzed before transmitting a control signal.

At block 702, the method 700 begins. At block 704, the method 700 determines whether the rolling door is operating on AC power. In other words, the block 704 may determine a power status of the rolling door before receiving an alarm signal or transmitting any control signals. If the answer is "no," there may be a power failure, and the rolling door may be operating on a battery back-up. The method 700 may proceed to block 706.

At block 706, the method 700 determines whether there is ample DC voltage from the battery back-up. If the answer is no, the method 700 may proceed to block 708. If the answer is yes, the method 700 may proceed to block 710.

At block 708, the method 700 waits until the power status is fixed. Once the power status is fixed (e.g., the AC power is restored or there is sufficient DC voltage from the battery back-up), the method 700 may proceed back to block 704.

At block 704, if the answer is "yes" (e.g., the rolling door is properly operating on AC power), the method 700 may proceed to block 710.

At block 710, the method 700 receives an alarm signal. For example, the alarm signal may be transmitted from a sensor to a controller.

At block 712, the method 700 determines whether the alarm signal is a restricted access alarm. If the answer is "yes", the method 700 may proceed to block 714.

At block 714, the method 700 may determine if the door is open. If the door is open, the method may proceed to block 716. At block 716, the method 700 may transmit a signal to close the door. The method 700 may then proceed to block 732.

Referring back to block 714, if the answer is "no" (e.g., the door is not open) the method 700 may proceed to block 730 to wait until the alarm is cleared.

Referring back to block 712, if the answer is "no", the method 700 may proceed to block 718. At block 718, the method 700 determines whether the alarm signal is an evacuation alarm. If the answer to the block 718 is "yes," then the method 700 may proceed to block 720.

At block 720, the method 700 determines whether the door is open. In other words, at block 720 the method 700 may determine a current state of the rolling door. If the answer to block 720 is "no," then the method 700 may proceed to block 722. At block 722, the method 700 transmits a control signal to open the rolling door. For example, the controller may transmit the control signal to the motor to cause the motor to rotate a barrel in an opening direction to open the rolling door. The method 700 may then proceed to block 732.

If the answer to block 720 is "yes" (e.g., the door is already in an open state), then the method 700 may proceed to block 730. At block 730, the method 700 may wait to determine whether the alarm is cleared.

Referring back to block 718, if the answer to block 718 is "no," then the method 700 may proceed to block 724. At block 724, the method 700 determines that the alarm signal is sensor error alarm. The method 700 then proceeds to block 726.

At block 726, the method 700 may provide a visual and/or audible indication. As discussed above, the controller may transmit control signals to the motor to move the rolling door in a predefined sequence of movements to provide a visual indication of the sensor error. The audible indication may be a siren or other type of audible alarm emitted from a speaker of the rolling door system in combination with the visual indication.

At block 728, the method 700 determines whether the sensor alarm is cleared or corrected. If the answer to the block 728 is "no," the method 700 may loop back to block 726 to provide the visual and/or audible indication. If the answer to block 728 is "yes," then the method 700 may proceed to block 732.

At block 730, the method 700 may determine whether the alarm is cleared. For example, the evacuation alarm signal may stop transmitting when there is no longer a fire or smoke threat, or the restricted access alarm may stop transmitting when police arrive to neutralize an active shooter situation or an attempted burglary. If the answer to block 730 is "no," then the method 700 may continue to loop within the block 730 until the alarm is cleared.

If the answer to the block 730 is "yes," then the method 700 may proceed to block 732. At block 732, the method 700 may return to a normal operation. For example, control may be restored to a local control interface that is used to open and close the rolling door, and the alarm signal or signals may be cleared from the controller. At block 734, the method 700 ends.

Figure 8:
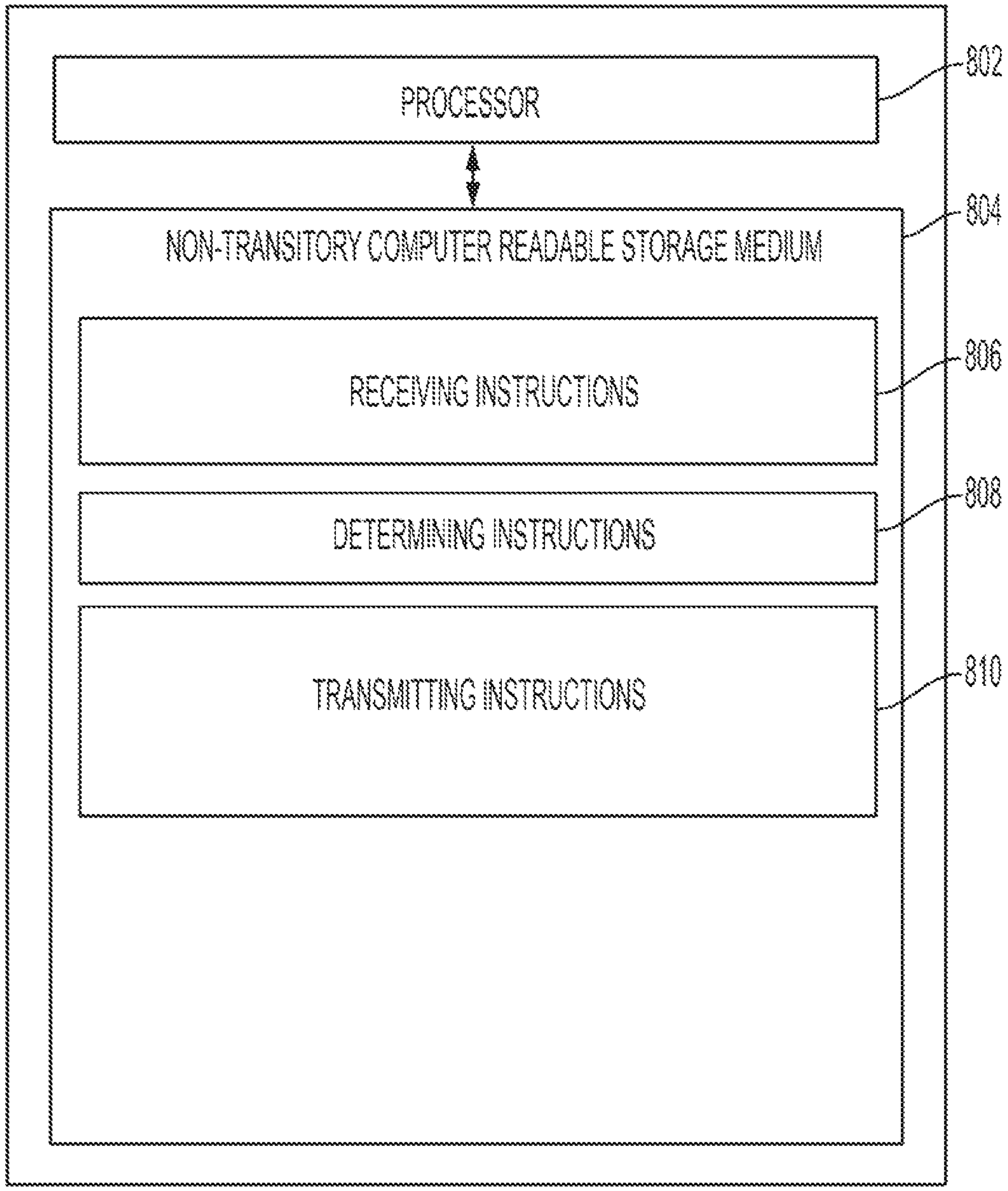
FIG. 8 illustrates an example non-transitory computer readable storage medium storing instructions executed by a processor to control operation of a rolling door with two-way operator logic control of the present disclosure.

FIG. 8 illustrates an example of an apparatus 800. In an example, the apparatus 800 may be the controller 108 in FIG. 1. In an example, the apparatus 800 may include a processor 802 and a non-transitory computer readable storage medium 804. The non-transitory computer readable storage medium 804 may include instructions 806, 808, and 810 that, when executed by the processor 802, cause the processor 802 to perform various functions.

In an example, the instructions 806 may include receiving instructions. For example, the instructions 806 may receive an alarm signal. For example, the alarm signal may be received from one or more sensors that are deployed at a location and communicatively coupled to the apparatus 800.

The instructions 808 may include determining instructions. For example, the instructions 808 may determine a type of alarm associated with the alarm signal. For example, the type of alarm may be determined based on the type of sensor that transmitted the alarm signal.

The instructions 810 may include transmitting instructions. For example, the instructions 810 may transmit a control signal to operate a motor to open or close the rolling door in response to the type of alarm that is determined. For example, if the type of alarm is an evacuation alarm, then the control signal may operate the motor to rotate a barrel of the rolling door to open the rolling door. If the type of alarm is a restricted access alarm, then the control signal may operate the motor to rotate the barrel of the rolling door to close the rolling door. If the type of alarm is a sensor error, then the control signal may operate the motor to move the rolling door in a predefined sequence to provide a visual indication that the sensor error is detected.

In one embodiment, the control signal may be continuously transmitted to the motor until the alarm is cleared. When the alarm is cleared, the control signal may be removed and the rolling door may return to a normal operative state.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:

receiving, by a processor, an alarm signal;

determining, by the processor, a type of alarm associated with the alarm signal, wherein the type of alarm is one of a plurality of different types of alarms, wherein the plurality of different types of alarms is associated with a different movement of a rolling door, wherein a first type of alarm of the plurality of different types of alarms is associated with opening the rolling door, wherein a second type of alarm of the plurality of different types of alarms is associated with closing the rolling door, wherein a third type of alarm of the plurality of different types of alarms is associated with moving the rolling door in a predefined sequence, wherein a fourth type of alarm of the plurality of different types of alarms is associated with moving the rolling door to a particular position; and transmitting, by the processor, a control signal to operate a motor to cause a movement of the rolling door that is associated with the type of alarm that is determined.

2. The method of claim 1, wherein the first type of alarm comprises an evacuation alarm, and the movement comprises opening the rolling door in response the evacuation alarm.

3. The method of claim 1, wherein the second type of alarm comprises a restricted access alarm, and the movement comprises closing the rolling door in response to the restricted access alarm.

4. The method of claim 1, wherein the determining the type of alarm is based on a type of sensor that transmitted the alarm signal to the processor.

5. The method of claim 4, wherein the type of sensor comprises a smoke detector to indicate that the type of alarm is an evacuation alarm.

6. The method of claim 4, wherein the type of sensor comprises a video camera with facial recognition or a motion detector to indicate that the type of alarm is a restricted access alarm.

7. The method of claim 1, further comprising:

receiving, by the processor, a second alarm signal;

determining, by the processor, that the second alarm signal is associated with the second type of alarm that is different from the first type of alarm associated with a previous alarm signal;

determining, by the processor, that the second type of alarm has a higher priority than the first type of alarm; and transmitting, by the processor, a second control signal to operate the motor to cause the movement of the rolling door that is associated with the second type of alarm with the higher priority.

8. The method of claim 1, further comprising:

determining, by the processor, a power status and a current state of the rolling door before the control signal is transmitted.

9. The method of claim 1, wherein the third type of alarm comprises a sensor error, and the movement comprises the predefined sequence to provide a visual indication that the sensor error is detected.

10. A non-transitory computer readable storage medium encoded with instructions which, when executed, cause a processor of a controller of a rolling door system including a rolling door to:

receive an alarm signal;

determine a type of alarm associated with the alarm signal, wherein the type of alarm is one of a plurality of different types of alarms, wherein the plurality of different types of alarms is associated with a different movement of a rolling door, wherein a first type of alarm of the plurality of different types of alarms is associated with opening the rolling door, wherein a second type of alarm of the plurality of different types of alarms is associated with closing the rolling door, wherein a third type of alarm of the plurality of different types of alarms is associated with moving the rolling door in a predefined sequence, wherein a fourth type of alarm of the plurality of different types of alarms is associated with moving the rolling door to a particular position; and transmit a control signal to operate a motor to cause a movement of the rolling door that is associated with the type of alarm that is determined.

11. The non-transitory computer readable storage medium of claim 10, wherein the first type of alarm comprises an evacuation alarm, and the movement comprises opening the rolling door in response the evacuation alarm.

12. The non-transitory computer readable storage medium of claim 10, wherein the second type of alarm comprises a restricted access alarm, and the movement comprises closing the rolling door in response to the restricted access alarm.

13. The non-transitory computer readable storage medium of claim 10, wherein the type of alarm is determined based on a type of sensor that transmitted the alarm signal to the processor.

14. The non-transitory computer readable storage medium of claim 13, wherein the type of sensor comprises a smoke detector to indicate that the type of alarm is an evacuation alarm.

15. The non-transitory computer readable storage medium of claim 13, wherein the type of sensor comprises a video camera with facial recognition or a motion detector to indicate that the type of alarm is a restricted access alarm.

16. The non-transitory computer readable storage medium of claim 10, further comprising instructions to cause the processor to:

receive a second alarm signal;

determine that the second alarm signal is associated with the second type of alarm that is different from the first type of alarm associated with a previous alarm signal;

determine that the second type of alarm has a higher priority than the first type of alarm; and transmit a second control signal to operate the motor to cause the movement of the rolling door that is associated with the second type of alarm with the higher priority.

17. The non-transitory computer readable storage medium of claim 10, further comprising instructions to cause the processor to:

determine a power status and a current state of the rolling door before the control signal is transmitted.

18. The non-transitory computer readable storage medium of claim 10, wherein the third type of alarm comprises a sensor error, and the movement comprises the predefined sequence to provide a visual indication that the sensor error is detected.

19. A rolling door system, comprising:

a rolling steel grill door;

a barrel, wherein the rolling steel grill door is coupled to the barrel, and rotation of the barrel causes the rolling steel grill door to open or close;

a motor coupled to the barrel to rotate the barrel in a clockwise or counter-clockwise direction; and a controller communicatively coupled to the motor, wherein the controller is to:

receive an alarm signal;

determine a type of alarm associated with the alarm signal, wherein the type of alarm is one of a plurality of different types of alarms, wherein the plurality of different types of alarms is associated with a different movement of a rolling door, wherein a first type of alarm of the plurality of different types of alarms is associated with opening the rolling door, wherein a second type of alarm of the plurality of different types of alarms is associated with closing the rolling door, wherein a third type of alarm of the plurality of different types of alarms is associated with moving the rolling door in a predefined sequence, wherein a fourth type of alarm of the plurality of different types of alarms is associated with moving the rolling door to a particular position; and transmit a control signal to operate the motor to cause a movement of the rolling steel grill door that is associated with to the type of alarm that is determined.

20. The rolling door system of claim 19, further comprising:

a plurality of different types of sensors communicatively coupled to the controller, wherein the type of alarm is determined based on a type of sensor of the plurality of different types of sensors that transmits the alarm signal to the controller.

* * * * *